United States Patent [19]
Mullett

[11] Patent Number: 5,655,214
[45] Date of Patent: Aug. 5, 1997

[54] TELEVISION BROADCAST DISTRIBUTION SYSTEMS COMPRISING BASE STATION WITH A TUNER AND COMPUTER OUTSTATIONS

[75] Inventor: Anthony John Mullett, Bovey Tracey, United Kingdom

[73] Assignee: Amulet Electronics Limited, United Kingdom

[21] Appl. No.: 524,607

[22] Filed: Sep. 7, 1995

[51] Int. Cl.⁶ .................................................. H04N 7/173
[52] U.S. Cl. .................. 455/5.1; 455/4.2; 348/8; 348/12; 348/552
[58] Field of Search ................ 348/6, 7, 12, 13, 348/8, 10, 11, 552, 14, 15, 16, 17; 455/3.1, 4.1, 4.2, 5.1, 6.1, 6.2, 6.3; 371/32; H04N 7/16, 7/173, 7/10

[56] References Cited

U.S. PATENT DOCUMENTS

| | | | |
|---|---|---|---|
| 4,584,684 | 4/1986 | Nagasawa et al. | 348/12 |
| 5,245,429 | 9/1993 | Virginio et al. | 348/426 |
| 5,359,367 | 10/1994 | Stockill | 348/552 |
| 5,374,952 | 12/1994 | Flohr | 348/12 |
| 5,481,296 | 1/1996 | Cragun et al. | 348/13 |
| 5,488,412 | 1/1996 | Majeti et al. | 348/12 |
| 5,541,662 | 7/1996 | Adams et al. | 348/552 |
| 5,557,675 | 9/1996 | Schupak | 348/552 |

FOREIGN PATENT DOCUMENTS 2117210  10/1983  United Kingdom .

*Primary Examiner*—Michael H. Lee
*Assistant Examiner*—Chris Grant
*Attorney, Agent, or Firm*—Ira S. Dorman

[57] ABSTRACT

A base station includes a tuner and teletext decoder 32 which outputs baseband video, audio and raw text data at 36, 37 and 39, along a cabling infrastructure 40. A remote PC 41 has a capture card to receive and display the video picture and assemble the text data into a picture which is stored and displayed as required. The PC also displays a control application window which, by pointing and clicking with a mouse 45, allows control signals to be sent to the tuner 32 to select channels and pages via a microcontroller 34. The text information is subjected to an error checking and re-transmission protocol at the PC.

8 Claims, 3 Drawing Sheets

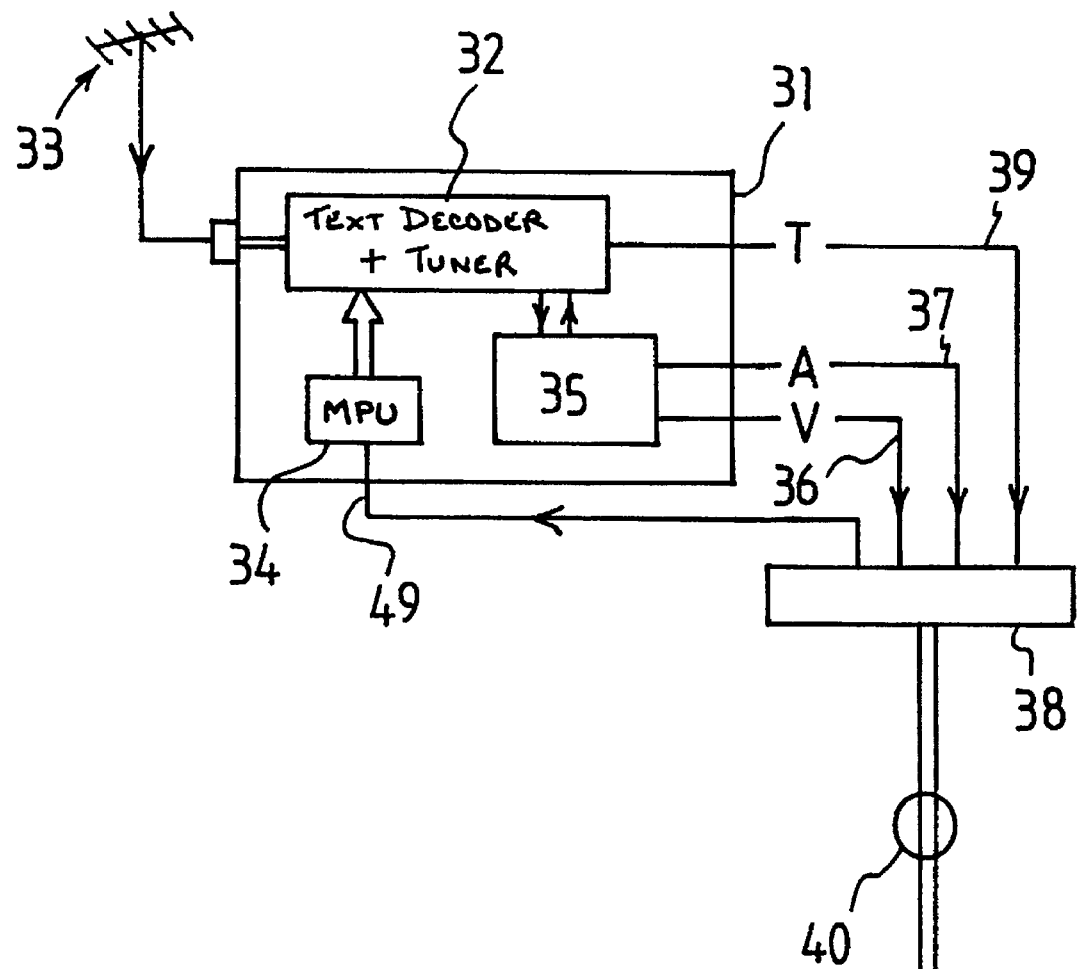
FIG 2
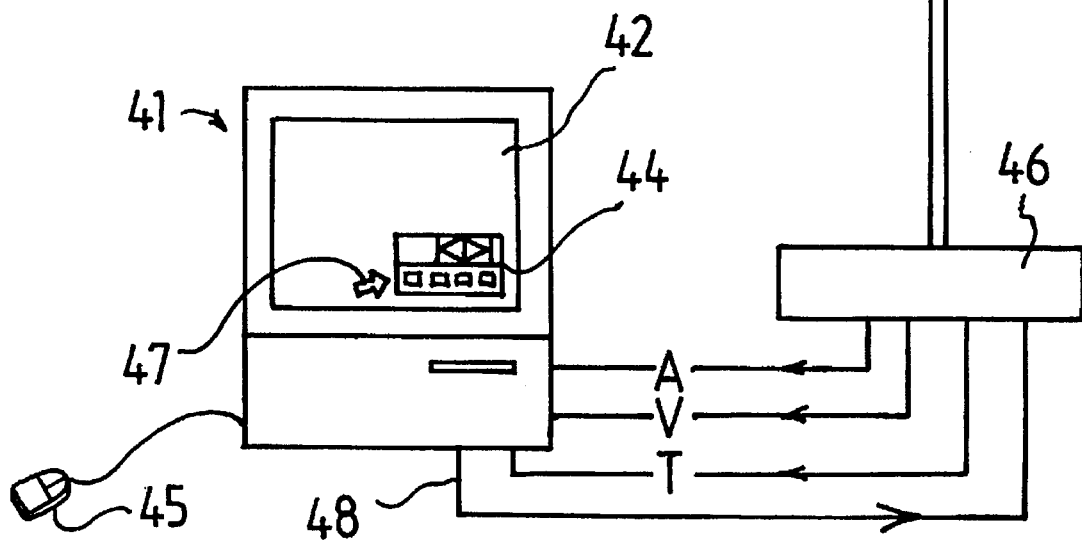

TELEVISION BROADCAST DISTRIBUTION SYSTEMS COMPRISING BASE STATION WITH A TUNER AND COMPUTER OUTSTATIONS

TECHNICAL FIELD OF THE INVENTION

This invention relates to systems for distributing general-broadcast television and/or teletext signals to one or more remote viewing locations (referred to below as outstations).

BACKGROUND

Cable television systems are known which distribute incoming television signals to a number of remote television receivers. Often, a remotely-controlled switching matrix routes the video to the remote television receivers, distribution being carried out at radio frequencies. An example of such a system is described in GB 2 117 210-A.

In the recent past a number of TV tuner cards have become available for insertion into personal computers (PCs) to allow broadcast television programmes to be viewed on the computer monitor, usually via Windows (Microsoft trade mark) or similar graphical user interface software.

Such cards again receive a broadband aerial feed at radio frequencies, which may carry up to 1,000 or more different TV transmissions. These can be selected by the user using, in most cases, a tuning application which is generated in Windows and displayed on the monitor screen. The application window may depict a keypad of which various keys can be selected using a keyboard or a displayed pointer (cursor) controlled by a mouse. Clicking the mouse with the pointer on selected keys causes the chosen station to appear on the screen.

Some of the existing tuner cards have a baseband output which allows a composite TV signal (e.g. PAL, SECAM or NTSC) to be sent via suitable cabling, e.g. 75 ohm TV coax, to a remote outstation employing a computer and monitor. An audio output may also be provided so that accompanying mono or stereo sound can also be sent to the outstation.

The widespread use of this technology has so far been limited by the fact that the remote user is restricted to viewing the broadcast which has been selected at the host computer. Hitherto, the facility to select channels at the outstation has been achieved by providing a direct broadband aerial feed at broadcast frequencies with a separate tuner card at each outstation, but the cost of installing low loss high frequency cabling can be prohibitively high. Another technique makes use of existing data networks, but this involves digitising the video signals with a resulting escalation in cost and a deterioration in the final image.

An aim of the present invention may be viewed as being to provide a broadcast television distribution system which is superior to known.

SUMMARY OF THE INVENTION

The present invention proposes a television broadcast distribution system comprising:

(i) a base station comprising a tuner for receiving broadcast television signals from a wide-band input and having a tuning control input for controlling said tuner to select said broadcast signals, the tuner being arranged to provide a baseband video signal output which is derived from said selected broadcast signal;

(ii) cabling arranged to carry said baseband video signal output from the base station to a remote outstation; and (iii) an outstation including:

an input for receiving said baseband video signal output from said cabling, a computer which is programmed for displaying said signal output in the form of a picture, and manual input control means which communicates with the base station via cabling to cause control signals to be fed to said control input of the tuner in order to select the broadcast signal which is displayed at the outstation, said manual input means being arranged to produce said control signals in conjunction with a control image which is displayed by the computer.

The manual input control means may comprise a keyboard, mouse or trackball.

The term "baseband" refers to information which is not modulated onto a higher frequency carrier. In the case of video signals, the baseband information will generally be in composite, RGB (red/green/blue), VGA or super VGA form for example.

BRIEF DESCRIPTION OF THE DRAWINGS

The following description and the accompanying drawings referred to therein are included by way of non-limiting example in order to illustrate how the invention may be put into practice. In the drawings:

FIG. 2 is a schematic diagram of a second form of television broadcast distribution system of the invention for use by a single remote user.

DETAILED DESCRIPTION OF THE DRAWINGS

Figure 1:
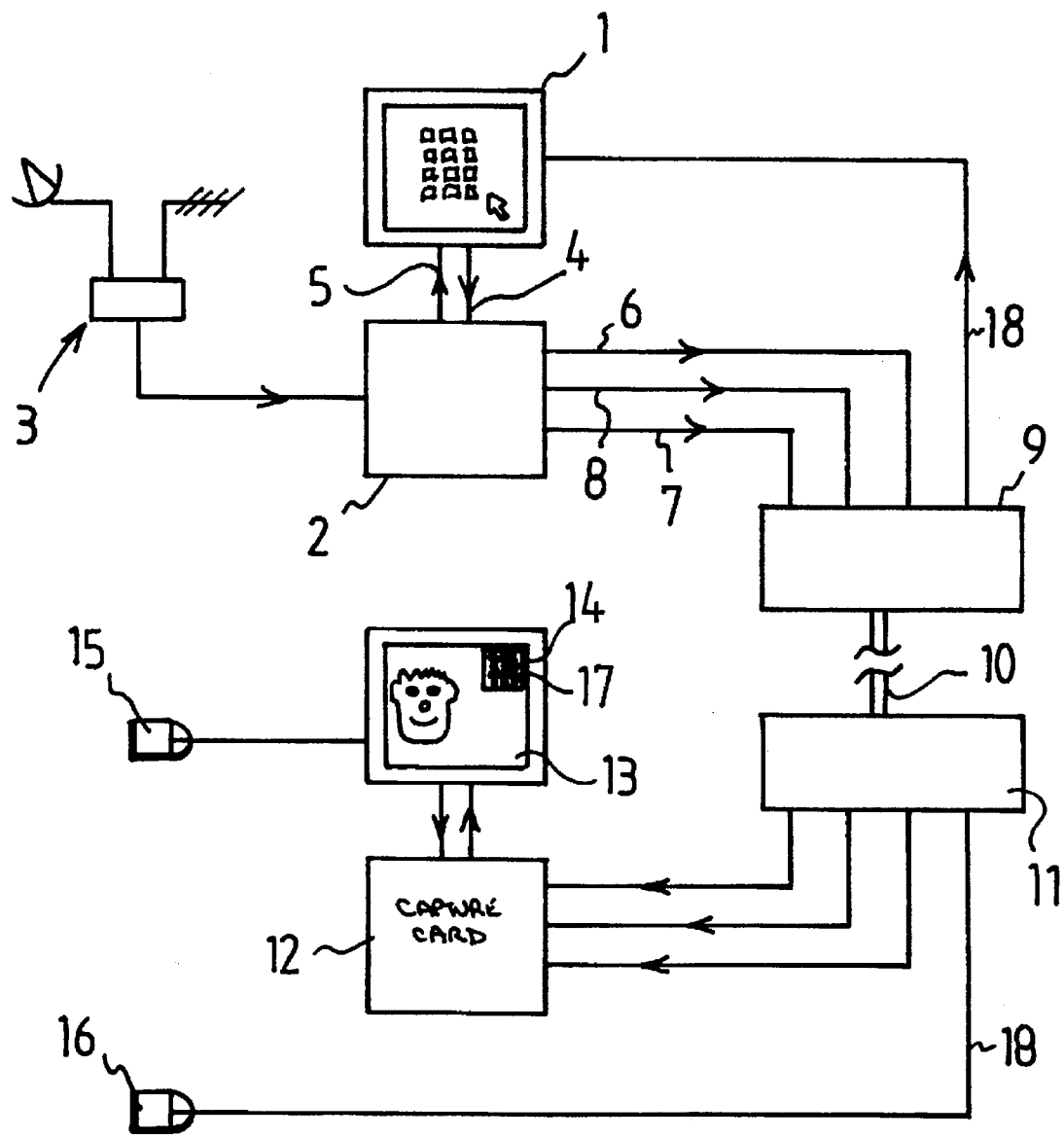
FIG. 1 is a schematic diagram of a simple form of television broadcast distribution system of the invention.

Referring firstly to FIG. 1, a host PC (personal computer) 1 operating under MS-DOS and Windows or similar graphical user interface software is provided with a tuner card 2 which receives broadband input of a number of satellite and/or terrestrial broadcast television signals via an appropriate antenna system 3. The PC controls the card 2 via a local bus 4 to tune in and process a selected television signal which is sent via bus 5 to be displayed by the PC. A control application image generated by the card 2 or in the PC in Windows is displayed by the PC. The displayed image may typically represent a simple numeric keypad.

The card 2 has outputs for low frequency, broadband composite or RGB video 6, demodulated audio signals 7 which accompany the broadcast television signals, and the control application image signal 8. A simple image signal generated by the card 2 could be sent down the video feed 6, but is shown as a separate feed for purposes of illustration. A separate feed 8 is, however, preferable when the application image is generated in Windows for example, since a more complex signal is generated.

The outputs 6–8 are fed via a suitable matching network 9 and twisted pair or other data grade cabling 10, which may be up to 250 meters or more in length. After passing through a further matching network 11 at a remote outstation, the three signals are fed to a simple video capture card 12 installed in an outstation PC 13. The PC 13 again operates under Windows, through which the received baseband video signals are displayed. The received application image signal 8 is overlaid on the main picture displayed on the PC monitor screen, but can be displayed or removed (i.e. reduced to an icon) using a mouse 15 which is used to control operation of the PC in the usual way. With the application image displayed, a second mouse 16 at the outstation can be used to send control signals along a control line 18 in cabling 10 to move a displayed pointer 17 which is generated in the host PC 1 or tuner card 2 and displayed as part of the control application image. By clicking the mouse 16 in the usual way, the pointer 17 can be used to select channel numbers on the application image which in turn signals the tuner card to receive the selected stations.

The received sound can be fed to a conventional sound card installed in the outstation PC.

Provided the two PCs have compatible mouse ports, a single mouse 15 could be used to control the application image 14 using a suitable switching arrangement. Such a switching arrangement may be a simple manual switch to transfer mouse control from the outstation PC to the host PC and back, or an electronic switch which is controlled either from the host or mouse by a predetermined combination of mouse clicks.

Decoded teletext data could also be sent from the tuner card 2 along the cabling 10 to be displayed at the remote outstation. The preferred manner in which this is achieved is described more fully below with reference to FIG. 2. The teletext page which is sent can again be controlled by the mouse 16 via control line 18.

Another form of television distribution system is shown in FIG. 2. A base station 31 includes a teletext decoder and tuner 32 which receives broadband input of satellite and/or terrestrial television signals via an antenna system 33. The tuner 32 is controlled by a microcontroller 34 to tune to a selected television signal which is demodulated and sent to an interface 35 to produce outputs for low frequency, baseband composite or RGB video 36 and demodulated audio 37. Decoded raw teletext data is also taken from the decoder 32 via a separate output 39.

The outputs 36, 37 and 39 are fed via a suitable matching network 38 (as described in GB Patent No. 2 258 778 for example) along twisted pair or other data grade distribution cabling 40, which may be up to 250 meters or more in length. At a remote outstation the signals pass via a further matching network 46 to a capture card for sound and video which is installed in an outstation PC 41. The PC 41 operates under Windows or other graphical user interface software, through which the received video and teletext signals are displayed in separate television and teletext windows on the PC monitor 42. The PC includes a mouse 45 which can be used to move a pointer 47 on the PC screen.

The teletext data is extracted and sent along line 39 to the remote PC 41 separately from the baseband audio and video signals. The data enters the PC through a serial port for processing by the PCs software. An error-checking protocol is used to detect any errors in blocks of received data (conveniently at the end of each line of data) and re-transmission of the block is requested if required. When an error-free text page is received the page can be stored in PC memory so that it can be called up instantly and displayed when required. When changed text pages are broadcast only the changed data blocks are transmitted and re-written into memory at the receiving PC. Each complete received page is interpreted as visual graphics by the PC software, for display on the PC screen. By this means, high resolution error-free text pages can be displayed separately from the television images, and can be called up instantly when required.

The PCs operating software allows a tuning application window 44 to be displayed on the monitor screen. The application, television and teletext windows can be displayed or reduced to icons by pointing and clicking the mouse 45. The mouse and pointer can also be used to select channel numbers in the control application image, which in turn produces digital control signals at a serial port 48. The signals are then fed via the cabling 40 and matching networks 38, 39 to the base station 31. The control signals pass via an input 49 to the microcontroller 34, which in turn controls the tuner 32 to tune in and receive the selected station. In a similar manner, the mouse and pointer can be used to click on a teletext control application causing signals to be sent to the microcontroller 34 via cabling 40 to select teletext pages sent to the outstation PC.

The received sound is used to drive a sound card in the outstation PC 41.

Figure 3:
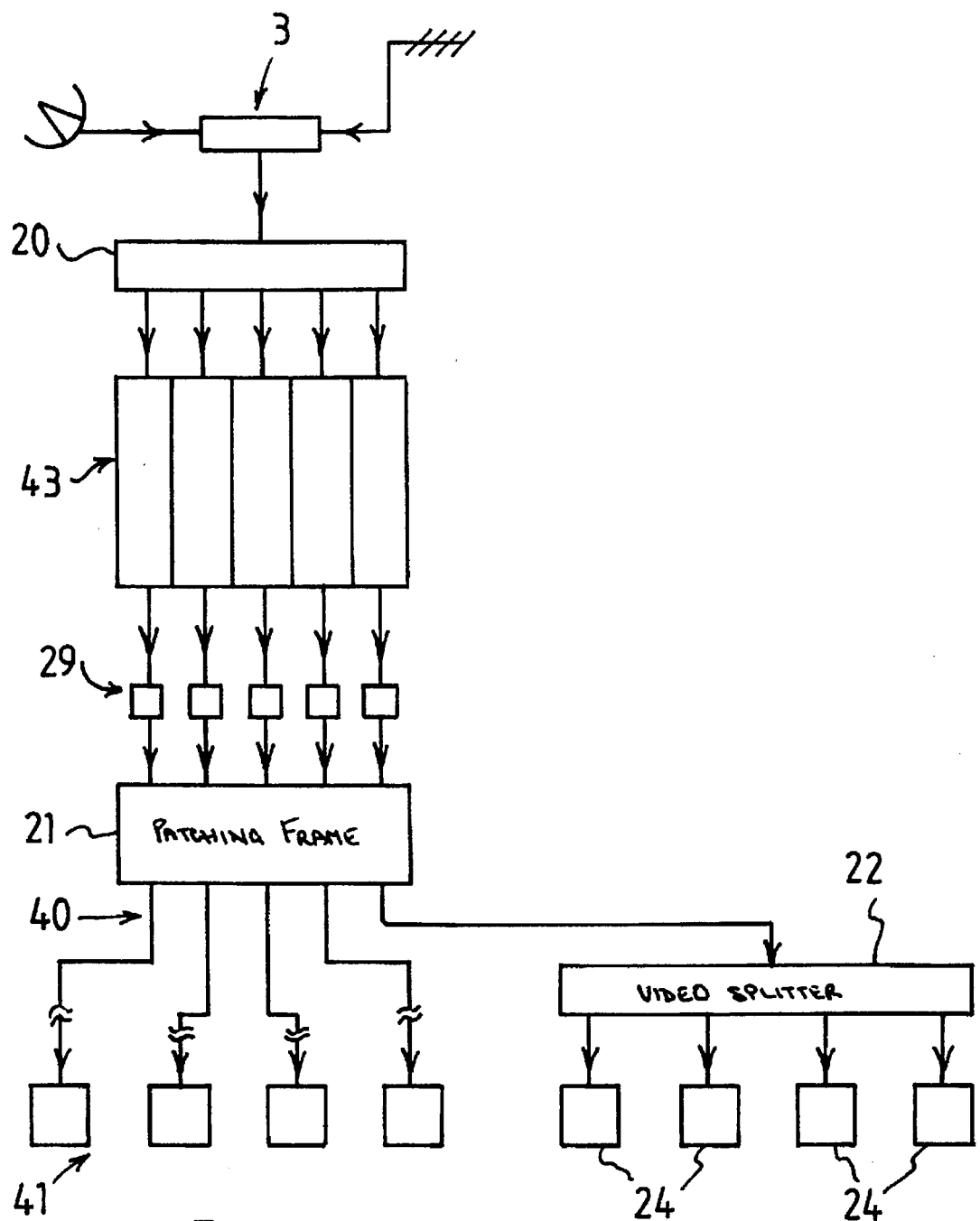
FIG. 3 is a further schematic diagram of a multiple-user form of the system of FIG. 2.

FIG. 3 shows a further development of the system of FIG. 2, in which a single aerial system 3 is fed via a splitter 20 to a number of tuner cards 43. Respective video, teletext and audio outputs from each card are fed via matching networks 29 to a patching frame 21 which sends the signals via data grade distribution cabling 40 to separate remote PCs 41 which again control the tuning of the respective tuner cards 43 via the cabling 40 as described. FIG. 3 also shows that one or more of the outputs from the tuner cards 43 could be fed to a video splitter 22 at the remote end of the cabling to feed a number of PCs or dumb monitors 24. These monitors will thus all display the same received signal which is, again, remote-tuned via the cabling 40.

It will be appreciated that in each of the systems described, the video, audio, teletext and digital control signals from the mouse could be sent along separate or common feed lines depending on the frequency band of the signals. The feed lines could travel in the same or different cabling runs. A pre-existing local area network cabling infrastructure (e.g. Ethernet or Token Ring) could conveniently be used.

In each example a trackball or keyboard could be used instead of a mouse, in known manner. Although a Windows environment is convenient to use the display and control could be implemented in DOS based software if desired.

I claim:

1. A television broadcast distribution system comprising:
   (i) a base station comprising a tuner for receiving broadcast television signals from a wide-band input and having a tuning control input for controlling said tuner to select said broadcast signals, said tuner being arranged to provide a baseband video signal output which is derived from said selected broadcast signal;
   (ii) data-grade cabling constructed and arranged to carry said baseband video signal output from said base station to a remote outstation; and
   (iii) an outstation remote from said base station and including:
   an input for receiving said baseband video signal output from said cabling,
   a computer which is programmed for displaying said signal output in the form of a picture, and
   manual input control means which communicates with said base station via said cabling to cause control signals to be fed to said control input of said tuner in order to select the broadcast signal which is displayed at said outstation, said manual input means being arranged to produce said control signals in conjunction with a control image which is displayed by said computer.

2. A distribution system according to claim 1, in which said control image is generated at the outstation.

3. A distribution system according to claim 1, in which the outstation computer is provided with a capture card for receiving said signal output.

4. A distribution system according to claim 1, in which said signal output comprises text data.

5. A distribution system according to claim 4, in which said text data is subjected to error-checking at the outstation, and in the event of any errors being detected a re-transmission request is sent to the base station via cabling.

6. A distribution system according to claim 4, in which said text data is stored at the outstation.

7. A distribution system according to claim 4, in which said text data is used at the outstation to generate a picture for display at the outstation.

8. A television broadcast distribution system comprising:
(i) a base station comprising a tuner for receiving broadcast television signals from a wide-band input and having a tuning control input for controlling said tuner to select said broadcast signals, said tuner being arranged to provide a baseband video signal output which is derived from said selected broadcast signal;
(ii) data-grade cabling constructed and arranged to carry said baseband video signal output from said base station to a remote outstation; and
(iii) an outstation remote from said base station and including:
an input for receiving said baseband video signal output from said cabling,
a computer which is programmed for displaying said signal output in the form of a picture, and
manual input control means which communicates with said base station via said cabling to cause control signals to be fed to said control input of said tuner in order to select the broadcast signal which is displayed at said outstation, said manual input means being arranged to produce said control signals in conjunction with a control image which is displayed by said computer;
said control image being generated at said base station and fed to said outstation via said cabling.

* * * * *